United States Patent [19]

Smith et al.

[11] 4,384,564

[45] May 24, 1983

[54] PROCESS OF FORMING A PLATED WIREPACK WITH ABRASIVE PARTICLES ONLY IN THE CUTTING SURFACE WITH A CONTROLLED KERF

[75] Inventors: Maynard B. Smith, Newburyport; Frederick Schmid, Marblehead; Chandra P. Khattak, Danvers, all of Mass.

[73] Assignee: Crystal Systems Inc., Salem, Mass.

[21] Appl. No.: 227,171

[22] Filed: Jan. 22, 1981

[51] Int. Cl.³ .............................................. B28D 1/06
[52] U.S. Cl. ........................................ 125/18; 125/21
[58] Field of Search .................... 125/12, 18, 21, 16 R

[56] References Cited

U.S. PATENT DOCUMENTS

| 2,784,536 | 3/1957 | Barron | 125/21 |
| 2,924,050 | 2/1960 | Barron | 125/21 |
| 3,162,187 | 12/1964 | Chistensen | 125/15 |
| 3,205,624 | 9/1965 | Weiss | 125/15 |
| 3,626,921 | 12/1971 | Lane | 125/15 |
| 3,691,707 | 9/1972 | Von Arx et al. | 125/15 |
| 3,918,217 | 11/1975 | Oliver | 51/295 |
| 4,187,828 | 2/1980 | Schmid | 125/18 |

*Primary Examiner*—Harold D. Whitehead

[57] ABSTRACT

A narrow wire blade with abrasive particles plated within a longitudinally-extending, plated cutting portion that extends from only one side of a wire core and has parallel side walls spaced by a controlled width.

6 Claims, 4 Drawing Figures

FIG 1
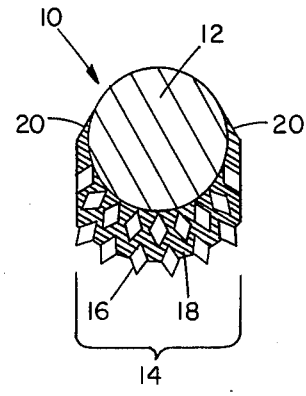
FIG 2
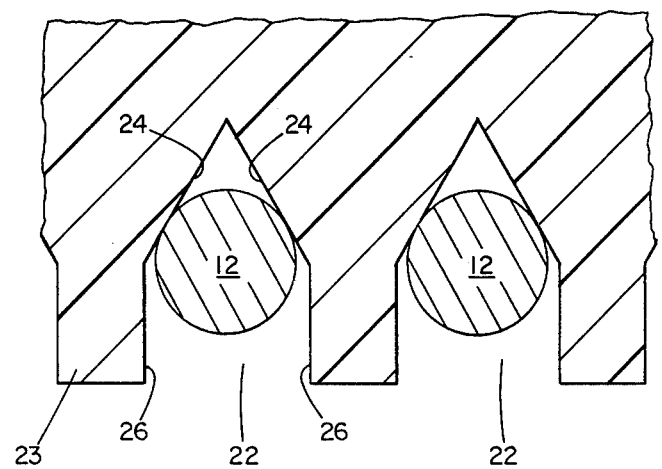
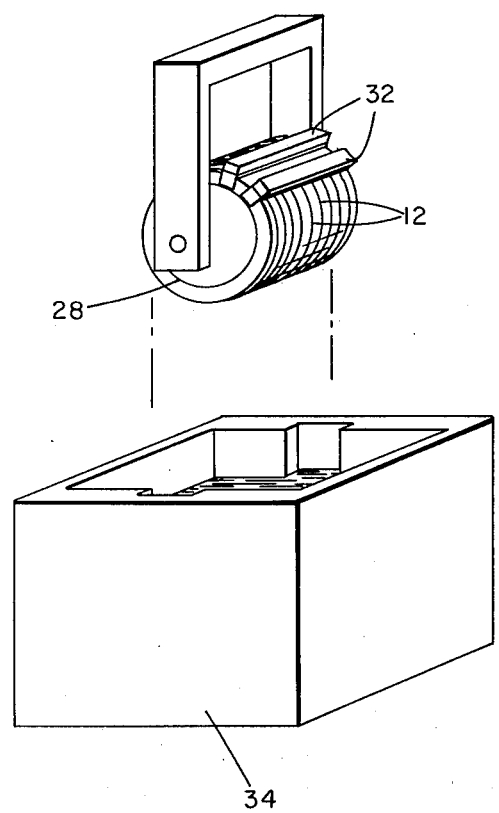
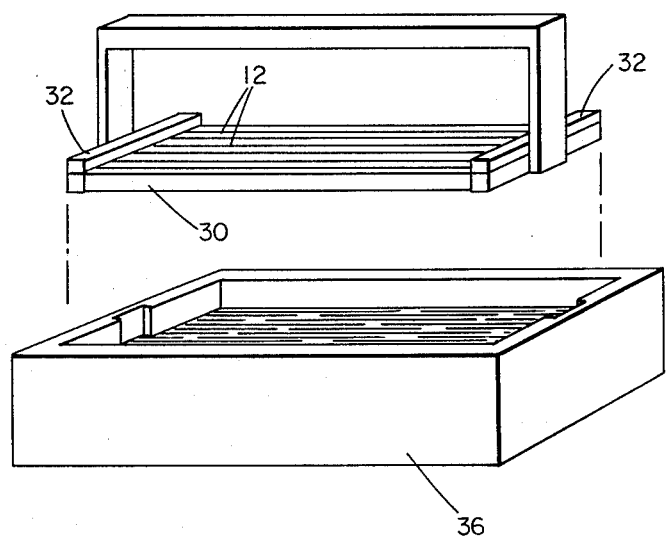
FIG 3
FIG 4

PROCESS OF FORMING A PLATED WIREPACK WITH ABRASIVE PARTICLES ONLY IN THE CUTTING SURFACE WITH A CONTROLLED KERF

The invention described herein was made in the performance of work under NASA Contract Number NAS 7-100, JPL No. 954,373 and is subject to the provisions of Section 305 of the National Aeronautics and Space Act of 1958 (72 Stat. 435; 42 U.S.C. 2457).

FIELD OF THE INVENTION

The invention relates to wire blades with abrasive particles for use in wafering hard materials.

BACKGROUND OF THE INVENTION

In slicing wafers from hard materials, e.g., silicon ingots used in manufacturing photovoltaic cells, it is desirable to decrease costs by increasing material utilization i.e., wafers per linear inch of material, and also by decreasing expendable material costs, e.g., by increasing the blade life.

The wafer yield has been increased by using blades having abrasive particles embedded in only cutting portions, as is disclosed in Schmid U.S. Pat. No. 4,187,828, and by reducing the lateral wander of blades during cutting by minimizing vibrations and using guide rollers, as is taught in our patent application U.S. Ser. No. 201,247 filed Oct. 27, 1980 and entitled Multi-Wafer Slicing with a Fixed Abrasive, which application has been abandoned in favor of continuation application U.S. Ser. No. 421,120 filed Sept. 22, 1982.

The blade life has been increased by operating at high speeds, as is also taught in the above-mentioned patent application, and by reducing abrasive particle pullout by plating the entire surface of a wire blade having the abrasive particles already embedded in it, as is taught in U.S. Pat. No. 4,187,828. Plating the entire wire surface, however, results in increasing the width of the blade, thereby increasing the kerf width and decreasing the yield.

SUMMARY OF THE INVENTION

In general, our invention features a narrow wire blade with abrasive particles fixed to it by plating them within a cutting portion of the blade that extends from substantially only one side of the core and has substantially parallel side walls spaced by a controlled width. Such a plated-abrasive wire blade suffers less abrasive pullout than impregnated-and-plated wires, and because there are no abrasive particles or plating extending beyond a controlled distance to the sides, kerf width is kept to a desired minimum, and the number of wafers per inch can be increased. In preferred embodiments more than one layer of abrasive is plated, and different sized abrasive particles are used, both features acting to extend the blade life even longer and to avoid blade wander and kerf loss from dulled blades; the plated material is nickel; the abrasive material is 325-400 mesh diamond; and the core is about 5 mils in diameter, the blade's cross-section extends in its cutting portion to a width of less than 7 mils, and the cutting portion extends downward more than 3 mils.

In another aspect our invention features making a blade pack of such wire blades by plating abrasive particles to wire cores while the noncutting core surfaces are shielded from the plating solution by portions defining grooves in a nonmetallic roll or plate in which the wires are seated and in which the grooves have pairs of vertical side walls spaced from each other by a distance slightly larger than the core width. In preferred embodiments the grooves taper at their bottoms to shield wire from plating and to promote proper seating of the wire blade during cutting; the grooves' tapers from 60° angles; and electricity is used to promote the plating.

DESCRIPTION OF THE PREFERRED EMBODIMENT

Objects, features and advantages of the invention will appear from the following detailed description of the structure, preparation, and use of a preferred practice thereof, taken together with the attached drawings in which:

FIG. 1 is a vertical section of a wire blade made according to the invention;

FIG. 2 is a vertical section of a grooved portion of a mold used during plating the wire cores;

FIG. 3 is a diagrammatic perspective view of a cylindrical mold with wires in its grooves about to be immersed into a plating solution; and FIG. 4 is a diagrammatic perspective view of a flat grooved mold with wires in its grooves about to be immersed in a plating solution.

STRUCTURE

Referring to FIG. 1, there is shown wire blade 10 made of 5 mil diameter core 12 and cutting portion 14 consisting of abrasive particles 16 (a mixture of particles ranging in size from 325-400 mesh) fixed in nickel plating 18 attached to the longitudinally-extending lower surface of core 12. Cutting portion 14 is approximately 7 mil wide between vertical sides 19 and extends downward between 3 or 4 mils from core 12. The cutting portion 14 tapers along flat surfaces 20 from its 7 mil width to uncovered portions of the core. Surfaces 20 are in planes that form a 60° angle with each other and are tangent to core 12.

Preparation

In making wire blades 10, the wire cores 12 are first fixed between two clamps as is described in Schmid U.S. Pat. No. 4,178,670, which is hereby incorporated by reference. Referring to FIG. 2, the wire cores 12 are seated in grooves 22 of non-conductive mold 23, made of a polymer of tetrafluoroethylene, on which there will be no plating. Each groove 22 has tapering surfaces 24, that make a 60° angle between them, and vertical walls 26, spaced from each other by 7 mils.

Either a cylindrical grooved mold 28 (FIG. 3) or a flat mold 30 (FIG. 4) can be used.

If cylindrical mold 28 is used, the mold can be the same roll that the wire cores 12 are wound on, as is described in U.S. Pat. No. 4,178,670. The wire cores 12 will be seated in circumferential grooves 22 and held in place between support clamps 32. After immersion in plating solution 34, mold 28 is rotated and nickel plating attaches to the exposed surfaces of cores 12, trapping suspended diamond particles 16 within the plating.

If the flat mold 30 is used, the wire cores 12 and clamps 32 are removed from the winding roll, the wire cores 12 are stretched, the wire cores 12 and clamps 32 are connected to plate 30 with each of the cores 12 seated in grooves 22, and the molds and wire blade pack are immersed in plating solution 36. The diamond particles are either suspended in solution 36 prior to immersion, or sprinkled onto the surface after immersion, thereby allowing them to settle into the grooves.

Plating using either shielding technique results in narrow blades, owing to the spaced vertical walls 26. By extending the length of time for plating, more than one layer and/or various sizes of plated abrasives can be fixed without increasing the width of the blade. Because the mold is made of nonmetallic material, there is no plating on its surfaces, and because the noncutting portions of the wire blades 10 are covered, plating 18 and abrasive 16 are not wasted by covering those portions.

In a most preferred embodiment electroplating is used to promote speedy and controlled plating.

Use

In use the plated wire blades 10 are attached by clamps 32 to a cutting machine of the type disclosed in the above-mentioned patent application, which is hereby incorporated by reference. In such a machine there are guide rollers with circumferential 60° V-grooves in which the wires 10 are seated. The guide rollers will not be worn down by abrasive particles 16, because the abrasives will not be in contact with them. Also, tapering surfaces 20 match the guide roller groove surfaces and keep the cutting portions 14 in proper orientation during cutting, thereby avoiding lateral wander of the blades.

Because more than one layer of size of fixed abrasive is attached, as the lower cutting layers become worn-out, new abrasive particles are exposed, and blade life will be increased. Also, the narrow widths of the wire blades act to increase the effective pressure on the diamond tips thereby improving the performance of the diamond by producing sharp cutting edges. Furthermore, because the width of blades 10 is precisely controlled, a predetermined narrow kerf results, and the number of wafers per linear inch is increased. Finally, the use of a mixture of various sizes of diamonds has been found to permit increases in the cutting rate (mils/min) and the number of wafers which did not break during cutting.

Other Embodiments

Variations of the above-described embodiments will be obvious to those in the art. For example, even smaller diameter cores and narrower blades can be constructed to even further increase the yield.

What is claimed is:

1. A wire blade for use in wafering hard materials, said blade comprising:
   a circular in cross-section wire core having a longitudinally-extending, noncutting upper surface, and
   a longitudinally-extending cutting portion extending downward from, and plated onto, the lower surface of said core,
      said cutting portion comprising plating material and abrasive particles trapped within said plating material,
   said cutting portion having substantially parallel vertical side surfaces spaced from each other by a controlled distance slightly larger than the width of the said core, and a pair of tapering surfaces tangent to and extending from opposite sides of said core to the top of said side surfaces, said noncutting upper surface being exposed above the junction of said tapering surfaces and said core.

2. The blade of claim 1 wherein said cutting portion has more than one layer of plated abrasive.

3. The blade of claim 2 wherein the plated material is nickel and the abrasive particles are diamond.

4. The blade of claim 1 wherein said tapering surfaces are in planes forming angles of about 60° with each other.

5. The blade of claims 1, 2, 3 or 4 wherein said core is about 5 mil in diameter and said vertical surfaces are less than 7 mil apart and said cutting portion extends downward from said lower core surface more than about 3 mils.

6. The blade of claims 1, 2 or 3 wherein said particles are a mixture of diamond particles varying in size between 325 and 400 mesh.

* * * * *